(12) United States Patent
Elgharib et al.

(10) Patent No.: US 10,217,187 B2
(45) Date of Patent: Feb. 26, 2019

(54) METHOD FOR DYNAMIC VIDEO MAGNIFICATION

(71) Applicant: QATAR FOUNDATION FOR EDUCATION, SCIENCE AND COMMUNITY DEVELOPMENT, Washington, DC (US)

(72) Inventors: Mohamed Abdelaziz A. Mohamed Elgharib, Doha (QA); Mohamed M. Hefeeda, Doha (QA); William T. Freeman, Acton, MA (US); Frederic Durand, Somerville, MA (US)

(73) Assignees: QATAR FOUNDATION FOR EDUCATION, SCIENCE AND IMMUNITY DEVELOPMENT, Doha (QA); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 15/579,924

(22) PCT Filed: Jun. 3, 2016

(86) PCT No.: PCT/US2016/035687
§ 371 (c)(1),
(2) Date: Dec. 5, 2017

(87) PCT Pub. No.: WO2016/196909
PCT Pub. Date: Dec. 8, 2016

(65) Prior Publication Data
US 2018/0225803 A1    Aug. 9, 2018

Related U.S. Application Data

(60) Provisional application No. 62/171,816, filed on Jun. 5, 2015.

(51) Int. Cl.
*G06T 3/40* (2006.01)
*H04N 5/262* (2006.01)
(Continued)

(52) U.S. Cl.
CPC ............... *G06T 3/40* (2013.01); *G06T 5/005* (2013.01); *G06T 7/33* (2017.01); *H04N 5/23248* (2013.01);
(Continued)

(58) Field of Classification Search
None
See application file for complete search history.

(56) References Cited

U.S. PATENT DOCUMENTS 6,927,783 B1 * 8/2005 MacInnis ................. G06T 9/00
345/592
8,504,941 B2   8/2013 Rose
(Continued)

OTHER PUBLICATIONS

Park et al., "Efficient motion compensation usung multiple warped reference pictures based on feature tracking and segmentation", Proceedings of the 16th IEEE international conference on Image processing, pp. 1601-1604, Nov. 7-10, 2009.

*Primary Examiner* — Xiao M Wu
*Assistant Examiner* — Steven Z Elbinger
(74) *Attorney, Agent, or Firm* — Richard C. Litman

(57) ABSTRACT

The method for dynamic video magnification magnifies small motions occurring simultaneously within large motions. The method involves selecting a region of interest from a video for magnification. The region of interest is warped to obtain a stabilized sequence of frames that discounts large motions. Each frame of the stabilized sequence is decomposed to a foreground layer, a background layer, and an alpha matte layer, and each of the foreground and alpha matte layers is magnified. Then a magnified sequence is generated from the magnified layers using matte inversion. Any image holes in the magnified sequence are filled in using texture synthesis. Finally, the magnified sequence is de-warped to the original space-time coordinates.

1 Claim, 3 Drawing Sheets

(51) Int. Cl.
  *H04N 5/232*   (2006.01)
  *G06T 5/00*    (2006.01)
  *G06T 7/33*    (2017.01)

(52) U.S. Cl.
  CPC . *H04N 5/2628* (2013.01); *G06T 2207/10016* (2013.01); *G06T 2207/20104* (2013.01)

(56) References Cited

U.S. PATENT DOCUMENTS

| | | |
|---|---|---|
| 2006/0232607 A1 | 10/2006 | Davignon et al. |
| 2007/0257934 A1 | 11/2007 | Doermann et al. |
| 2008/0001962 A1 | 1/2008 | Lefebvre et al. |
| 2009/0213234 A1 | 8/2009 | Chen et al. |
| 2011/0199536 A1* | 8/2011 | Wolf .................. G06K 9/42 348/441 |
| 2011/0254840 A1* | 10/2011 | Halstead ................ G06T 15/04 345/421 |
| 2013/0111399 A1* | 5/2013 | Rose ..................... G06T 3/0025 715/800 |
| 2014/0072229 A1* | 3/2014 | Wadhwa ................ G06K 9/481 382/197 |
| 2014/0211858 A1* | 7/2014 | Zhao ................. H04N 19/00903 375/240.26 |
| 2014/0243614 A1 | 8/2014 | Rothberg et al. |
| 2014/0313329 A1 | 10/2014 | Julien et al. |
| 2015/0022677 A1 | 1/2015 | Guo et al. |
| 2015/0256755 A1* | 9/2015 | Wu .................... H04N 5/23267 348/208.6 |
| 2016/0037085 A1* | 2/2016 | Mills ................... H04N 5/2628 348/222.1 |

* cited by examiner

METHOD FOR DYNAMIC VIDEO MAGNIFICATION

TECHNICAL FIELD

The present invention relates to video magnification, and particularly to a method for dynamic video magnification employing layer-based video magnification that can amplify small motions within larger motions.

BACKGROUND ART

Video magnification involves amplifying and visualizing subtle variations in image sequences. Conventional video magnification techniques are typically classified as either Lagrangian or Eulerian. In Lagrangian approaches, motions are estimated explicitly. Here, motions are defined as the subtle variations to be magnified. The Eulerian approaches, on the other hand, do not estimate motions explicitly. Rather, they estimate subtle variations by calculating non-motion compensated frame differences. Lagrangian approaches can only magnify motion changes, while Eulerian approaches can magnify motion as well as color changes. The "optical flow" technique involves feature point trajectories, which are extracted and segmented into two sets: stationary and moving. An affine motion model is fitted on the stationary points, which registers the examined sequence on a reference frame. Motions are re-estimated, scaled and added back to the registered sequence. This generates the magnified output.

The above techniques suffer from numerous drawbacks, specifically in their limitations in being able to deal with only very small motions and limited amplification factors. Only motions within a certain small range, and only amplification factors also within a limited range, can be handled; otherwise, visual artifacts are generated. These artifacts, which are typically multiplied upon generation, can take the form of intensity clipping, blurring and the like, thus destroying the magnified video. Thus, a method for dynamic video magnification solving the aforementioned problems is desired.

DISCLOSURE OF INVENTION

The method for dynamic video magnification faithfully magnifies small motions occurring simultaneously within large motions. The method involves selecting a region of interest (ROI) from a video for magnification. The region of interest is warped to discount large motions in order to obtain a stabilized sequence of input video frames. Each input video frame of the stabilized sequence is decomposed to a foreground layer, a background layer, and an alpha matte layer, and each of the foreground and alpha matte layers is magnified. A magnified sequence is then generated from the magnified layers using matte inversion. Any image holes in the magnified sequence are filled in using texture synthesis. Finally, the magnified sequence is de-warped to the original space-time coordinates to obtain dynamic video magnification of the region of interest.

These and other features of the present invention will become readily apparent upon further review of the following specification and drawings.

BRIEF DESCRIPTION OF THE DRAWINGS

Similar reference characters denote corresponding features consistently throughout the attached drawings.

BEST MODES FOR CARRYING OUT THE INVENTION

Figure 1:
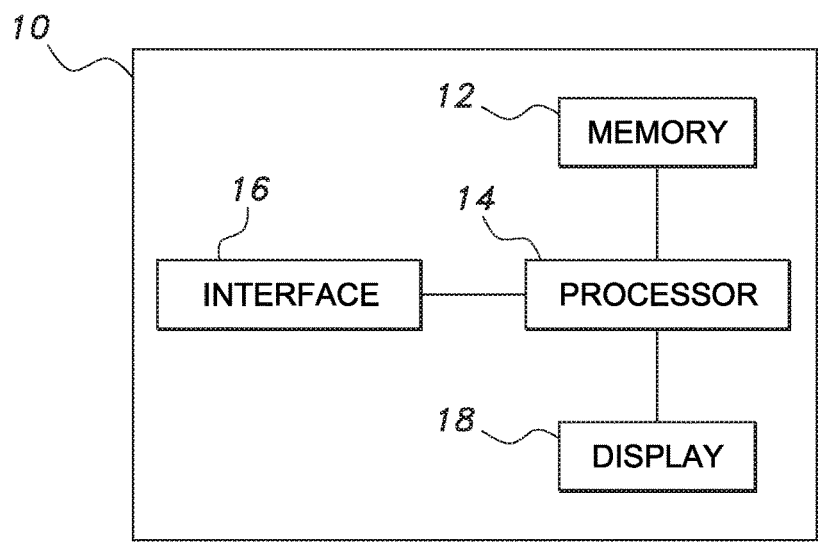
FIG. 1 is a block diagram illustrating system components for implementing a method for dynamic video magnification according to the present invention.

The method for dynamic video magnification faithfully magnifies small motions occurring simultaneously within large motions. Generally, the method involves selecting a region of interest (ROI) from a video for magnification. The region of interest is warped to discount large motions in order to obtain a stabilized sequence of input video frames. The warping process removes large motions while preserving small ones, specifically without introducing artifacts that could be magnified. Warping is performed by any suitable type of warping technique, such as the Kanade-Lucas-Tomasi (KLT) feature tracker, optical flow, low-order parametric models for large-scale motion, or the like.

Each input video frame of the stabilized sequence is decomposed to a foreground layer, a background layer, and an alpha matte layer, and each of the foreground and alpha matte layers is magnified. A magnified sequence is then generated from the magnified layers using matte inversion. Any image holes in the magnified sequence are filled in using texture synthesis. Finally, the magnified sequence is de-warped to the original space-time coordinates to obtain dynamic video magnification of the region of interest.

In the present method, users may begin the process by specifying the region to be magnified using "scribbles" on a reference frame, r. Given an input sequence I, a stabilized sequence $I^S$ is first estimated by temporally registering over the reference frame r. Large scale motion is modeled in the region of interest with low-order models $\Phi$ (either affine or translation-only) to preserve the small-scale motion to be magnified:

$$I^S(x,t) = I(\Phi_{r,t}(x),t), \qquad (1)$$

where x denotes two-dimensional (2D) pixel coordinates. Given a set of points $X_t$ in frame t and their corresponding $X_r$, $\Phi_{r,t}(x)$ is found by minimizing $\|\Phi_{r,t}(X_t) - X_r\|^2$. As noted above, $X_t$ and their corresponding $X_r$ may be generated using a KLT feature tracker or optical flow.

With regard to estimating $\Phi_{r,t}$ via the KLT feature tracker, one begins with a set of points in frame t and their correspondence in the next frame, and the goal is to match them by fitting either an affine or translation model. Temporal smoothness is imposed on Φ using a Moving Average Filter (MAF). Next, a local window of five frames is used, where the local window is centered on the examined frame t and weighted by W~𝒩 (0,4). To reduce fitting errors, Iterative Reweighted Least Squares (IRLS) is used for solving Φ. The weights are set inversely proportional to $\|\Phi_{r,t}(x)-x\|^2$. A temporally iterative scheme is then used to estimate Φ between an examined frame t and the reference r. First, an estimate of Φ for each pair of consecutive frames is generated. For example, if r>t, then $\Phi_{t+1,t}, \Phi_{t+2,t+1}, \Phi_{t+3,t+2}, \ldots, \Phi_{r,r-1}$ is estimated. Thus, the direct transformation from t to r becomes $\Phi_{r,t} = \Pi_{u=t}^{u=r-1} \Phi_{u+1,u}$. Given $\Phi_{r,t}$, frame t is stabilized by applying equation (1). For r<t, the same process is performed, but in the opposite time direction. This stabilizes the entire sequence I over the reference frame r.

Since optical flow is more sensitive to motion errors than feature point trajectories, one main adjustment is necessary: A temporally iterative scheme is not used for estimating $\Phi_{r,t}$, since errors could pile up. Instead, Φ is directly estimated between the examined frame t and the reference frame r, i.e., in one shot. Here, optical flow is estimated between the reference frame r and all frames of the examined sequence. With this in consideration, one proceeds with estimating the model parameters as for feature point trajectories.

It is important to base the motion modeling of the warping stage on good motion candidates. This will reduce the risk of magnifying stabilization errors later on. Thus, one must choose between using the KLT feature tracker and optical flow. Only motion candidates inside a motion mask are considered. In order to select the warping process, KLT tracks are computed, and if the number of tracks as a percentage of the number of motion mask pixels is greater than some threshold, then the KLT feature tracker is selected. Otherwise, optical flow estimates may be used. For purposes of testing, the threshold was set at 5%.

Further, affine and translational models for Φ are estimated, and the model with the least stabilization error is selected, i.e., the model that minimizes $\Sigma_{t=1}^{T}\Sigma_{x=1}^{P}|I^S(x,t)-I(x,r)|$. Here, I(x,r) is the reference frame, T is the number of frames in the stabilized sequence $I^S$, and P is the number of pixels in one frame. This calculation is performed only over the region of interest (ROI).

With regard to the layer-based approach for video magnification, given the region of interest, the image is decomposed into three layers: an opacity matte, the foreground, and the background. Here, alpha matting is used. The opacity and foreground are magnified using the Eulerian approach. If one is interested in magnifying temporal color changes, then the linear technique is used. Otherwise, a phase-based technique may be used.

The magnified foreground is placed over the original background to reconstruct the remaining unmagnified sites. Next, texture synthesis is used to fill in image holes revealed by the amplified foreground motion. Remaining compositing artifacts may be removed through manual correction, if necessary. Finally, the magnified sequence is de-warped back to the original space-time coordinates. All steps are performed on every video frame.

It is important to note that the composite sequence is generated by superimposing the magnified foreground over the original background, as described above. However, directly using the original background would generate image holes in sites revealed by the magnified motion. Thus, prior to image compositing, the unknown background values are filled in through texture synthesis. Representing the magnified matte as $M_m$, the magnified foreground as $F_m$, the original background as B, and the in-painted background as B', the new magnified sequence can be expressed as $I_m(x) = M_m(x)F_m(x) + (1-M_m(x))B'(x)$, where x denote all image pixels. This process is applied for each frame of the examined sequence. This generates a stabilized magnified sequence.

It should be noted that compositing artifacts can be generated in sites where foreground and background estimates are similar. To fully remove such artifacts, the user is given the option to selectively in-paint specific regions. The user selects the corrupted sites in only the reference frame. The entire video is then corrected by filling the corrupted sites with original sequence values. Out of nine examined sequences, this manual correction was required in only one sequence. The last step of the present method de-warps the magnified composite sequence $I_m$ back to the original space-time coordinates. In use, the previously saved motion parameters ($\Phi_{r,t}$) can be used with the MATLAB function TriScatteredInterp to interpolate the de-warped sequence.

Experiments were performed on both real sequences as well as on synthetically-generated inputs with ground truth available. For the real sequences, performance was assessed qualitatively. For the controlled experiments, performance was assessed quantitatively against ground-truth. As will be described in greater detail below, the results showed that prior art methods optimized for small motion generated magnification artifacts when handling large displacements, whereas the present method significantly reduced artifacts and increased the domain of applicability. Table 1 below lists the examined sequences with the corresponding system parameters. The system parameters shown in Table 1 include the amplification factor (α), the examined frequency spectrum ($\omega_l - \omega_h$), and the sampling frequency ($f_s$).

TABLE 1

Sequences and Corresponding System Parameters

| Video | α | $\omega_l$ (Hz) | $\omega_h$ (Hz) | $f_s$ (fps) |
|---|---|---|---|---|
| Eye | 30 | 20 | 70 | 1000 |
| Bulb | 15 | 20 | 70 | 1000 |
| Gun | 20 | 8 | 33 | 480 |
| Water | 10 | 5 | 6 | 29 |
| Shadow | 50 | 2.8 | 3.2 | 29 |
| Parking | 40 | 4 | 5 | 29 |
| Leaves | 20 | 0.5 | 2 | 29 |
| Sim1 | 0-120 | 4.9 | 5.1 | 24 |
| Sim2 | 50 | 72 | 92 | 600 |

The present method has been compared against two prior art conventional video magnification approaches, namely, the Lagrangian and the Eulerian magnification techniques. For the Eulerian approach, the linear technique was used for the Bulb sequence, while the remaining sequences were processed with the phase technique. For the Lagrangian approach, the examined sequence was first stabilized as described above. Then, a dense motion field was estimated using the optical flow technique. Finally, magnification was achieved by scaling the motion field. Stabilization in the present method was assessed by comparison against Youtube® stabilization (available through the Youtube® video manager) and Adobe® stabilization (available through the Adobe® After Effects Warp Stabilizer VFX, which allows the user to define a motion mask). For purposes of comparison, the latter uses the same motion mask as in the present method. Optical flow was also used to generate motion estimates between each frame and the reference. For each frame, the pixels are moved using dense optical flow estimates. This generates a prediction of the examined frame as seen by the reference. Finally, Eulerian magnification is applied (as in the Youtube® and Adobe® techniques). For the Lagrangian, Adobe® After Effects Warp Stabilizer VFX, and optical flow comparisons, only the region of interest (ROI) was magnified. For the remaining techniques, the entire frame was magnified, where, in many cases, the ROI was moving, even after stabilization. For easier assessment, all results were temporally stabilized over the reference frame of the present method. Eulerian magnifications were also temporally stabilized, as described above. The remaining techniques, by definition, should be stabilized prior to magnification.

For the Bulb video sequence, a person is seen holding a bulb and moves it up in the vertical direction. Processing this sequence with the present method revealed a temporal variation in the light strength. This variation is caused by the alternating electrical current and is hardly noticeable with no magnification. Processing the Bulb sequence with optical flow did not reveal any temporal changes. This is because optical flow is estimated in a way to minimize temporal variations. The remaining techniques also did not reveal any useful temporal variations. The Eulerian approach generated color clipping artifacts. Such artifacts are due to filtering the temporal misalignments of the input frames. Similarly, clipping artifacts were generated by Youtube® stabilization errors. Finally, the Lagrangian approach generated noisy results.

The Parking sequence showed the entrance of an underground car park. The opening and closing of the white parking gate causes the gate to vibrate. Such vibration is too small to be observed from the original sequence. Processing the Parking sequence with the present method magnified the gate vibration. The present layered-based magnification maintained the integrity of the rest of the sequence. The Adobe® After Effects Warp Stabilizer VFX magnified the vibration. However, it generated more blurred results than the present method. In addition, it corrupted sites around the gate boundaries. However, the present method maintained the integrity of such sites through matting and texture synthesis. The parking vibration was not magnified by any other technique. The Eulerian and Youtube® techniques generated blurring artifacts, while the Lagrangian technique generated noisy results.

The Gun sequence shows a person firing a gun. Examining the original sequence shows that the shooter's hand is static while taking the shot. Magnifying the sequence with the present method showed that the arm moves as the shot is taken. The Eulerian, Youtube® and Adobe® techniques each generated blurred results. Optical flow did not reveal the arm movement.

The present method magnified regions of interest, maintained the integrity of nearby sites and outperformed all other techniques. The Eulerian approach generated blurry magnifications and Youtube® stabilization could not remove large motions, thus generating blurry results. Multiple moving objects generated stabilization errors in the Adobe® After Effects Warp Stabilizer VFX, and these errors were magnified. In addition, Adobe® After Effects Warp Stabilizer VFX usually corrupts sites around the examined object boundaries. The Lagrangian technique is sensitive to motion errors, and thus generates noisy results. Finally, direct motion compensation (i.e., optical flow) hardly amplifies temporal variations. This is because optical flow is estimated in a way to minimize temporal changes.

For the first simulation (Sim1), a reference frame containing a white circle and a red rectangle was generated. The white circle is the region of interest (ROI) to be magnified, while the red rectangle is used to generate motion candidates. A local motion is defined as $$d_j = A \sin\left(2\pi \cdot \frac{f}{f_s} \cdot j\right),$$

where A=0.25 pixels, f=5 cycles/frame and $f_s$=24 frames/second. Frame j is generated by shifting the white circle with $d_j$ along the horizontal direction. Doing that for 200 frames generates a sequence with the white circle vibrating. Here, (A, f) are the amplitude and frequency of vibration, respectively. Then, a large global motion is added to the vibrating sequence by shifting each frame by $$\Delta_j = A \sin\left(2\pi \cdot \frac{f}{f_s} \cdot j\right).$$

$\Delta_j$ is the global motion at frame j where A=40 and f=0.1. The global motion only occurs along the horizontal direction. The final generated sequence is Sim1.

Sim1 was processed using different magnification techniques. The aim was to assess the ability of magnifying the vibration of the white circle. Different amplification factors α were examined and compared against ground-truth. Ground-truth was generated using the same method of generating Sim1. For an amplification factor α, the corresponding ground-truth is calculated by shifting the white circle of the reference frame by $$d_j = A(\alpha+1) \sin\left(2\pi \cdot \frac{f}{f_s} \cdot j\right).$$

As in Sim1, j indexes the frames, A=0.25 pixels, f=5 cycles/frame and $f_s$=24 frames/second. For ground-truth, a global motion is not added, as all comparisons are performed against a temporally aligned version of the generated magnifications.

Figure 2A:
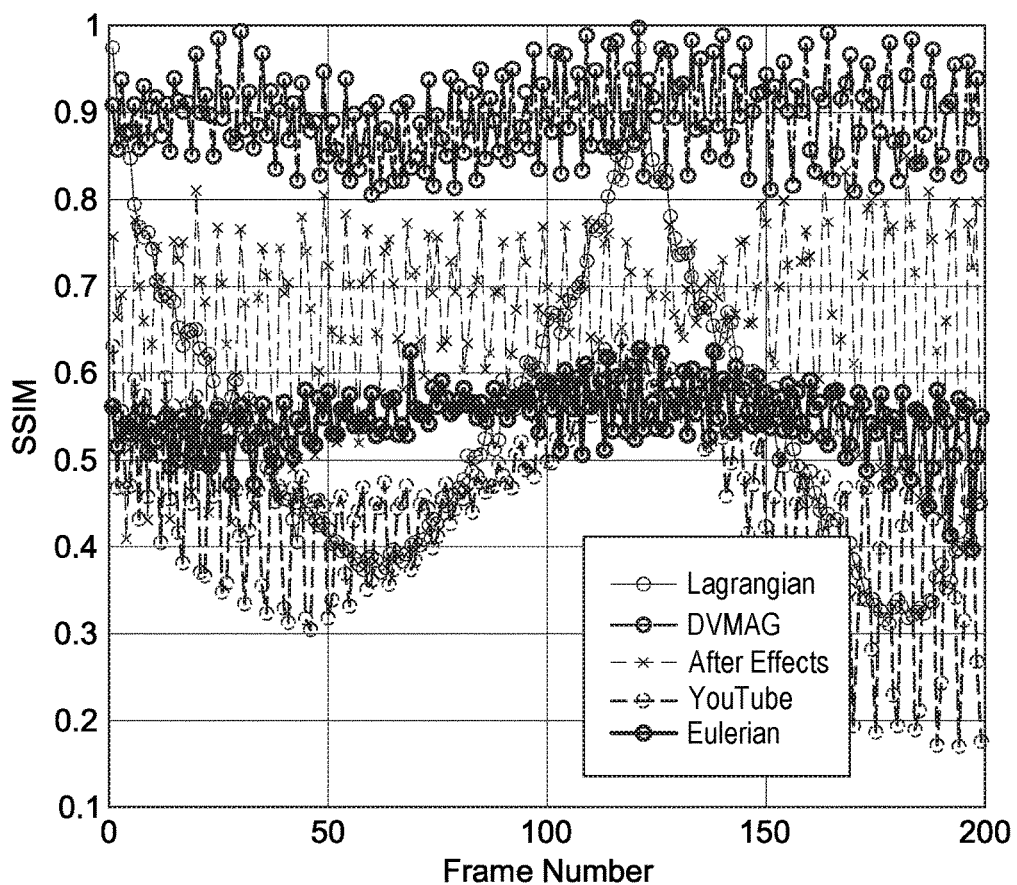
FIG. 2A is a graph comparing structure similarity as a function of frame number of the present method for dynamic video magnification (DVMAG) against those produced by conventional prior art techniques, including the Lagrangian technique, the Youtube® video manager, the Adobe® After Effects Warp Stabilizer VFX, and the Eulerian technique, each compared for a first video motion simulation.
Figure 2B:
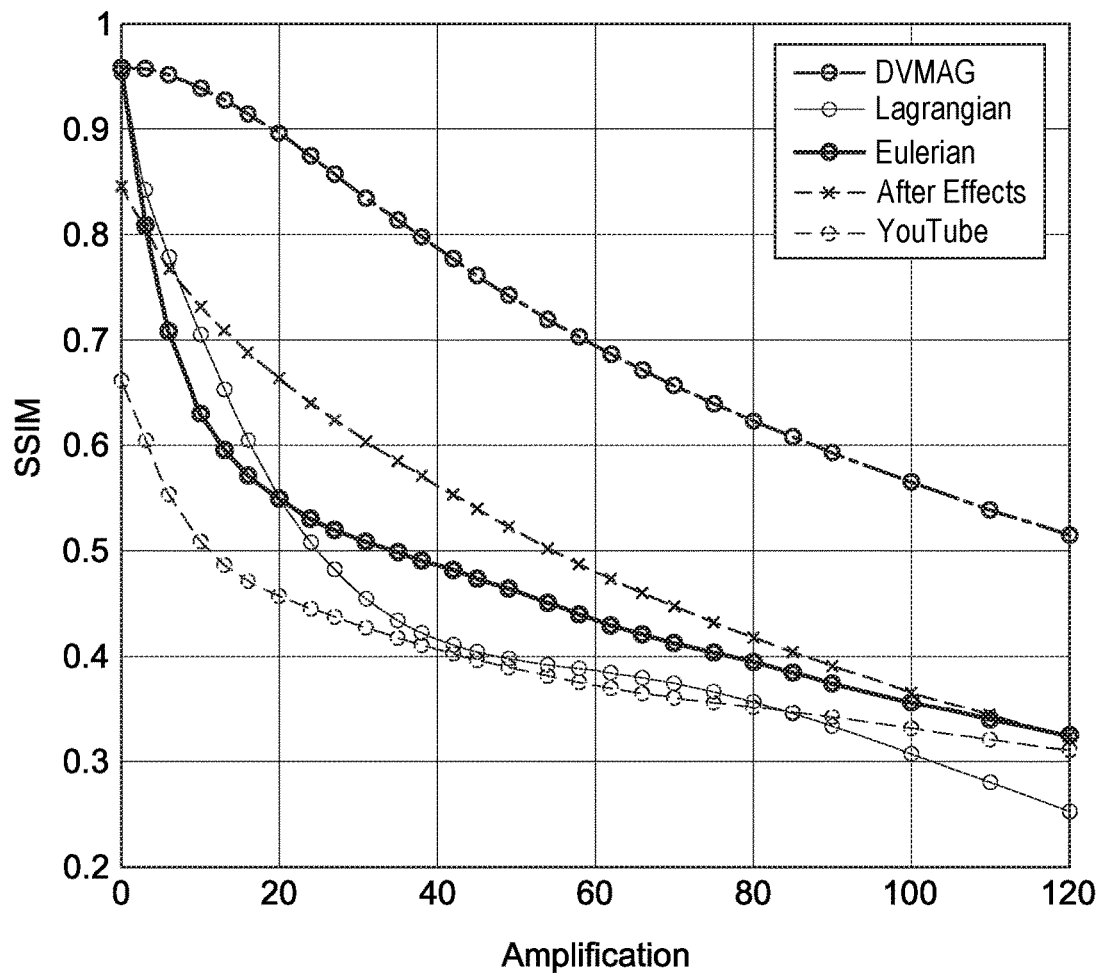
FIG. 2B is a graph comparing structure similarity as a function of amplification of the present method for dynamic video magnification (DVMAG) against those produced by conventional prior art techniques, including the Lagrangian technique, the Youtube® video manager, the Adobe® After Effects Warp Stabilizer VFX, and the Eulerian technique, each compared for the first video motion simulation.

FIGS. 2A and 2B show comparisons of structure similarity (SSIM) as functions of frame number and amplification, respectively, of the present method for dynamic video magnification (DVMAG) against those produced by the Lagrangian technique, the Youtube® video manager, the Adobe® After Effects Warp Stabilizer VFX, and the Eulerian technique, each compared for first video motion simulation Sim1. Here, α=20 and vibration rate is in the range of 4.9-5 Hz. Motion candidates are generated using KLT tracks on the red rectangle. In FIG. 2A, SSIM is shown with ground-truth for each examined frame. The SSIM($I_1$, $I_2$) measures the structure similarity between the two images $I_1$ and $I_2$. Here, SSIM=1 denotes exact ground-truth similarity and a value of 0 denotes no similarity at all.

The present DVMAG is found to best resemble ground-truth. The Eulerian and Youtube® techniques generate significant blurring artifacts, while the Lagrangian technique is sensitive to motion errors. The Adobe® After Effects Warp Stabilizer VFX generates poor stabilization due to the absence of enough long feature point trajectories. FIG. 2A shows that the Lagrangian error follows the same profile of the global motion. The error increases as the magnitude of the global motion increases. In addition, it reaches its minimum at frame 0 and 120, as global motion is minimal. This shows that Lagrangian magnification is sensitive to motion estimation errors. Examining the remaining techniques in FIG. 2A shows that DVMAG outperforms all other approaches.

FIG. 2B shows how Sim1 behaves with different amplifications α. Here, the mean SSIM of the entire magnified sequence against ground-truth is estimated at each α. FIG. 2B shows that DVMAG can handle larger amplifications with less errors over all other techniques. For example, errors in DVMAG with α=20 are almost equivalent to errors in the Eulerian, Adobe® and Lagrangian techniques with α=1. In addition, FIG. 2B shows that DVMAG has the slowest rate of degradation among most techniques. For example, in the range of α=0-40, the slopes of the Youtube®, Eulerian and Lagrangian techniques are steeper than DVMAG. This shows that DVMAG is more robust to magnification artifacts over all other approaches.

The second simulation (Sim2) begins with the Guitar video sequence, which does not have any large motion, only small motions due to the subtle movement of guitar strings. The phase technique is used to magnify the low E note. This magnification is treated as the ground-truth. A large global motion is then added in the same way global motion was added to Sim1. Here, A=50 and f=0.2, both in the horizontal and vertical directions. The generated sequence is Sim2. Sim2 was processed with the Eulerian approach, Adobe® After Effects Warp Stabilizer VFX and DVMAG. α was set to 50 and a frequency spectrum of 72-92 Hz was examined. For DVMAG, motion candidates were generated using optical flow. Here, the entire frame was treated as the motion mask.

Figure 3:
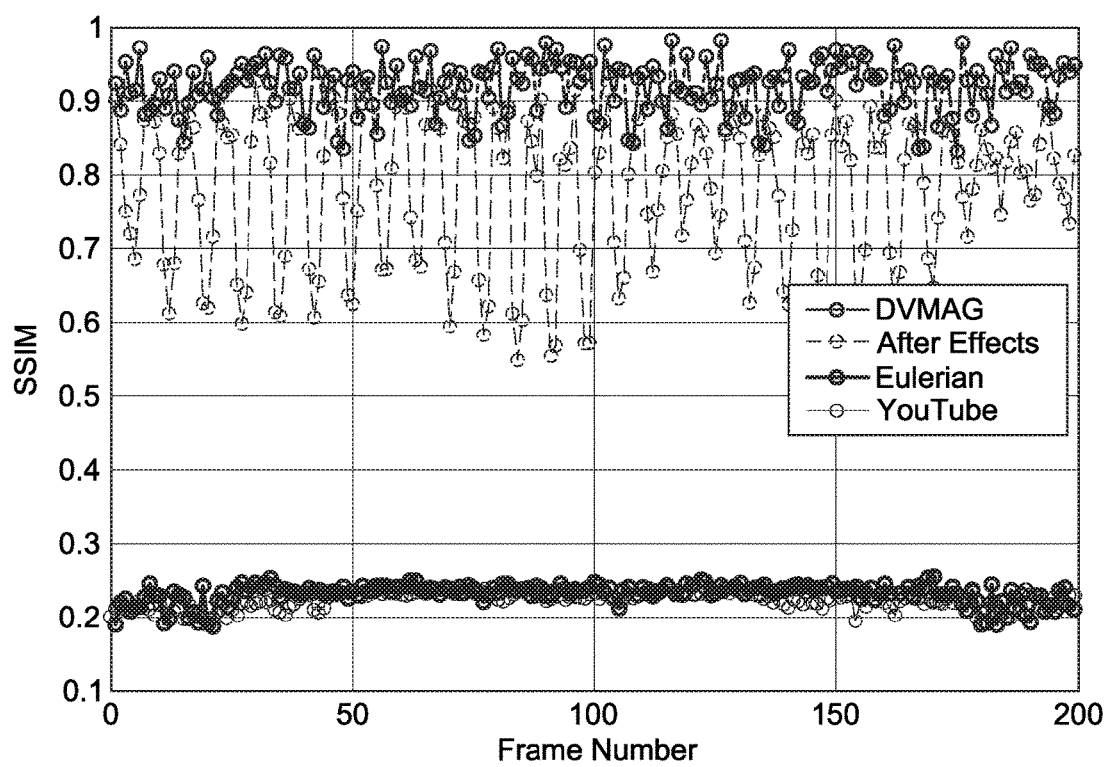
FIG. 3 is a graph comparing structure similarity as a function of frame number of the present method for dynamic video magnification (DVMAG) against those produced by conventional prior art techniques, including the Youtube® video manager, the Adobe® After Effects Warp Stabilizer VFX, and the Eulerian technique, each compared for a second video motion simulation.

In Sim2, the string vibration due to low E note is evident in the ground-truth. The Eulerian approach generates significant blurring and does not reveal the string vibration. DVMAG correctly resembles the ground-truth and does not generate blurring artifacts. FIG. 3 shows the SSIM of each magnified frame against ground-truth. The Adobe® After Effects Warp Stabilizer VFX stabilization suffered from temporal shakiness due to erroneous tracks. This shakiness became more apparent after magnification. DVMAG outperformed all techniques. In addition, it outperformed the Eulerian approach by a factor of around 200%.

It should be understood that the calculations may be performed by any suitable computer system, such as that diagrammatically shown in FIG. 1. Data is entered into system 10 via any suitable type of user interface 16, and may be stored in memory 12, which may be any suitable type of computer readable and programmable memory and is preferably a non-transitory, computer readable storage medium. Calculations are performed by processor 14, which may be any suitable type of computer processor and may be displayed to the user on display 18, which may be any suitable type of computer display.

Processor 14 may be associated with, or incorporated into, any suitable type of computing device, for example, a personal computer or a programmable logic controller. The display 18, the processor 14, the memory 12 and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 12, or in place of memory 12, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

It is to be understood that the present invention is not limited to the embodiments described above, but encompasses any and all embodiments within the scope of the following claims.

The invention claimed is:

1. A method for dynamic video magnification of small motions occurring simultaneously within large motions, comprising the steps of:
   selecting the small motions as a region of interest (ROI) from a video for magnification;
   warping the region of interest to discount the large motions, thereby obtaining a stabilized sequence of the small motion input video frames, wherein the warping technique is selected from the group consisting of a Kanade-Lucas-Tomasi (KLT) feature tracker, an optical flow, and parametric modeling;
   for each of the input video frames in the stabilized sequence:
      decomposing the frame into a foreground layer, a background layer, and an alpha matte layer;
      magnifying each of the foreground and alpha matte layers, wherein the magnification includes applying phase-based magnification;
      generating a magnified sequence of the magnified foreground and alpha matte layers by matte inversion, wherein the generated magnified sequence includes superimposing the magnified foreground layer over the background layer to reconstruct remaining unmagnified sites;
      filling in holes in the magnified sequence by texture synthesis; and
      de-warping the magnified sequence to original space-time coordinates after filling in the image holes to obtain dynamic video magnification of the region of interest.

* * * * *